US008578590B2

(12) United States Patent
Soma et al.

(10) Patent No.: US 8,578,590 B2

(45) Date of Patent: Nov. 12, 2013

(54) WIRE INSERTION TOOL

(75) Inventors: Fumihito Soma, Tokyo (JP); Minoru Majima, Tokyo (JP); Yosuke Sasaki, Tokyo (JP); Takuya Oshiba, Tokyo (JP); Hiroaki Miyazawa, Tokyo (JP); Takamitsu Hamanaga, Tokyo (JP); Kentaro Nishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/372,664

(22) Filed: Feb. 14, 2012

(65) Prior Publication Data

US 2012/0255168 A1 Oct. 11, 2012

(30) Foreign Application Priority Data

Apr. 6, 2011 (JP) ................................ 2011-084307

(51) Int. Cl.
*B23P 23/00* (2006.01)

(52) U.S. Cl.
USPC .................. 29/566.4; 29/749; 29/751; 7/107

(58) Field of Classification Search
USPC ................ 29/747–755, 734, 741, 857, 566.4; 7/107, 158; 81/463; 72/409.08–409.14
See application file for complete search history.

(56) References Cited

U.S. PATENT DOCUMENTS 3,885,287 A * 5/1975 Long et al. ...................... 29/705
3,886,641 A * 6/1975 Davis ............................ 29/56.6
4,110,896 A * 9/1978 Roiko .......................... 29/566.3
4,308,660 A * 1/1982 Brown et al. .................. 29/749
4,434,551 A * 3/1984 Holt .............................. 29/861
4,590,673 A * 5/1986 Dornes et al. .................. 29/845
4,631,815 A * 12/1986 Bocchicchio et al. .......... 29/739

FOREIGN PATENT DOCUMENTS

JP 4-2920 1/1992
JP 8-227786 9/1996
JP 8-250257 9/1996
JP 2511820 9/1996
JP 2003-224914 8/2003

OTHER PUBLICATIONS

Japanese Office Action dated Apr. 22, 2013 in corresponding Japanese Patent Application No. 2011-084307 with partial English translation.
Japanese Decision to Grant a Patent mailed Aug. 16, 2013 in corresponding Japanese Patent Application No. 2011-084307 with English translation.

* cited by examiner

*Primary Examiner* — Minh Trinh
(74) *Attorney, Agent, or Firm* — Wenderoth, Lind & Ponack, L.L.P.

(57) ABSTRACT

The wire insertion tool includes a first division block having a first wire insertion guide ditch forming plane where a first wire insertion guide ditch has been formed, a second division block having a second wire insertion guide ditch forming plane where a second wire insertion guide ditch has been formed, and a division block positioning guide. When the first division block and the second division block form a coupling unit by fitting the first wire insertion guide ditch forming plane and the second wire insertion guide ditch forming plane, the first wire insertion guide ditch and the second wire insertion guide ditch form a wire insertion guide hole. The division block positioning guide guides one of these blocks linearly to the other such that these planes approach to each other or separate from each other.

5 Claims, 4 Drawing Sheets

WIRE INSERTION TOOL

CROSS-REFERENCE

This patent application claims a priority on convention based on Japanese Patent Application No. JP 2011-084307. The disclosure thereof is incorporated herein by reference.

TECHNICAL FIELD

The present invention is related to a tool for inserting a wire into a contact pin and a method of inserting a wire in a contact pin.

BACKGROUND ART

An example of a technique for inserting a wire into a tubular object will be described below.

Patent Literature 1 discloses a sleeve wire insertion guide tool which is used for a new construction or a repair construction of a transmission and distribution wire. A termination treatment of a cut wire is carried out in the new construction works or the repair construction of the transmission and distribution wire. That is, the wire terminals formed by cutting the wire in the construction are inserted in a sleeve to oppose to each other, and are connected by a crimping connection of them and the sleeve by using the tool. The sleeve wire insertion guide tool is provided with a pair of division blocks obtained through division along into the direction of an axis line, and a spring with a wide width which biases the division blocks in the direction opposing to each other. The division blocks form an opening section of a cone shape, and a circular tube insertion section which has the inner diameter and the outer diameter which are substantially identical with those of the sleeve and which is communicated with the opening section. The spring is fixed to the insertion section. An operator expands a space between the division blocks with the hands against the biasing force by the spring and brings the end of the insertion section into contact to the sleeve. Then, the hands are released and the division blocks sandwiches the sleeve with the spring, to couple the insertion section and the sleeve. In this way, the sleeve wire insertion guide tool is attached to each of the ends of the sleeve. The sleeve with the sleeve wire insertion guide tools on the both ends is arranged between the wire terminals to be connected, and the wire terminals are inserted into the sleeve by moving in the direction opposing to each other. At this time, because each of the wire terminals is inserted into the sleeve along the inner wall of a cone-shaped opening of the sleeve wire insertion guide tool, the wire terminals are inserted in the sleeve in the alignment with the center of the sleeve. Then, the sleeve wire insertion guide tools are removed from the both ends of the sleeve and the wire terminals and the sleeve are crimped.

Patent Literature 2 discloses an insertion jig which is attached to each end of a sleeve to facilitate the insertion of a wire into the sleeve. The insertion jig is provided with a jig body and a hinge. The jig body consists of two longitudinal division parts. Each of the longitudinal division parts is provided with a half conical section and a half tube section provided to unify with the half conical section. The hinge connects the two longitudinal division parts to be openable and closable. The half conical sections of the two longitudinal division parts form a conical opening to facilitate the insertion of the wire. The two longitudinal division parts are closed such that the half tube sections of the two longitudinal division parts engage with the external circumferential surface of the sleeve, and the half tube sections are fixed on the sleeve with an adhesive tape. After inserting the wire in the sleeve, the adhesive tape is cut to remove the insertion jig from the sleeve.

The inventor of the present invention recognizes as follows. In the sleeve wire insertion guide tool disclosed in Patent Literature 1, there is a possibility that the spring is deformed through the repetitive use so that the structure formed from the division blocks is changed from an initial desired structure. In the insertion jig disclosed in Patent Literature 2, the shape precision of the structure formed from the two longitudinal division parts is low because of a looseness of the hinge. Therefore, it is difficult to apply the sleeve wire insertion guide tool of Patent Literature 1 and the insertion jig of Patent Literature 2 to a process of inserting a fine wire into a contact pin with a minimal diameter. Moreover, it is not possible to carry out a wire insertion process by only the sleeve wire insertion guide tool of Patent Literature 1 or the insertion jig of Patent Literature 2, and it is necessary to combine with another tool and instruments for the wire insertion.

CITATION LIST

[Patent Literature 1]: Japanese Registered Utility Model No. 2,511,820

[Patent Literature 2] JP H08-250257A

SUMMARY OF THE INVENTION

The purpose of the present invention is to provide a wire insertion tool and a method of inserting a wire, which are suitable for insertion of the fine wire into a contact pin with a minimal diameter.

The wire insertion tool by the present invention includes: a first division block having a first wire insertion guide ditch forming plane where a first wire insertion guide ditch has been formed; a second division block having a second wire insertion guide ditch forming plane where a second wire insertion guide ditch has been formed; and a division block positioning guide. When the first division block and the second division block form a coupling unit by fitting the first wire insertion guide ditch forming plane and the second wire insertion guide ditch forming plane, the first wire insertion guide ditch and the second wire insertion guide ditch form a wire insertion guide hole to pass through the coupling unit from one side thereof to the other side thereof. The division block positioning guide guides one of the first division block and the second division block linearly to the other such that the first wire insertion guide ditch forming plane and the second wire insertion guide ditch forming plane approach to each other or separate from each other.

The division block positioning guide includes two positioning pins which are fixed on one of the first division block and the second division block. The two positioning pins may be arranged in positioning pin arrangement holes formed in the other of the first division block and the second division block, respectively.

A first wire drawing ditch which is different from the first wire insertion guide ditch is formed on the first wire insertion guide ditch forming plane. A second wire drawing ditch which is different from the second wire insertion guide ditch is formed on the second wire insertion guide ditch forming plane. The first wire drawing ditch and the second wire drawing ditch form a wire drawing hole to pass through the coupling unit from one side thereof to the other side thereof, when the first division block and the second division block form the coupling unit by fitting the first wire insertion guide ditch forming plane and the second wire insertion guide ditch forming plane.

The wire insertion tool further includes: a spring configured to bias the first division block and the second division block so as to separate the first wire insertion guide ditch forming plane and the second wire insertion guide ditch forming plane.

The wire insertion tool further includes: a cam clamp configured to hold the first division block and the second division block in the condition that the first wire insertion guide ditch forming plane and the second wire insertion guide ditch forming plane are fit with each other.

In a wire inserting method, a wire insertion tool includes: a first division block having a first wire insertion guide ditch forming plane on which a first wire insertion guide ditch has been formed; a second division block having a second wire insertion guide ditch forming plane on which a second wire insertion guide ditch has been formed; and a division block positioning guide configured to guide one of the first division block and the second division block linearly to the other such that the first wire insertion guide ditch forming plane and the second wire insertion guide ditch forming plane approach to each other or separate from each other. The wire inserting method includes: forming a coupling unit from the first division block and the second division block such that the first wire insertion guide ditch forming plane and the second wire insertion guide ditch forming plane approach to each other or separate from each other; inserting a contact pin from the one side into the wire insertion guide hole which is formed from the first wire insertion guide ditch and the second wire insertion guide ditch to pass through the coupling unit from the one side to the other side; inserting a wire into the contact pin from the other side through the wire insertion guide hole; separating the first division block and the second division block such that a space is formed between the first wire insertion guide ditch forming plane and the second wire insertion guide ditch forming plane; and drawing out the wire together with the contact pin from the space between the first division block and the second division block.

A first wire drawing ditch which is different from the first wire insertion guide ditch is formed on the first wire insertion guide ditch forming plane, and a second wire drawing ditch which is different from the second wire insertion guide ditch is formed on the second wire insertion guide ditch forming plane. The first wire drawing ditch and the second wire drawing ditch forms a wire drawing hole to pass through the coupling unit from one side thereof to the other side thereof, in forming a coupling unit. The wire inserting method further includes: moving the wire and the contact pin from a position corresponding to the first wire insertion guide ditch and the second wire insertion guide ditch to a position corresponding to the first wire drawing ditch and the second wire drawing ditch, between the separating and the drawing.

The wire insertion tool further includes a spring configured to bias the first division block and the second division block. The separating includes: separating the first division block and the second division block by the spring.

The wire insertion tool further includes a cam clamp configured to hold the first division block and the second division block in the condition that the first wire insertion guide ditch forming plane and the second wire insertion guide ditch forming plane are fit with each other. The separating includes: separating the first division block and the second division block by operating the cam clamp.

The forming a coupling unit includes: pushing the first division block and the second division block each other such that the first wire insertion guide ditch forming plane and the second wire insertion guide ditch forming plane are fit with each other. Each of the inserting a contact pin and the inserting a wire includes: holding the first division block and the second division block in the condition that the first wire insertion guide ditch forming plane and the second wire insertion guide ditch forming plane are fit with each other. The separating includes: relaxing force to hold the first division block and the second division block in the condition that the first wire insertion guide ditch forming plane and the second wire insertion guide ditch forming plane are fit with each other.

According to the present invention, the wire insertion tool and a wire inserting method are provided, which are suitable for the insertion of a fine wire into a contact pin with a minimal diameter.

DESCRIPTION OF EMBODIMENTS

Hereinafter, a wire insertion tool and a method of inserting a wire according to the present invention will be described in detail with reference to the attached drawings.

First Embodiment

Figure 1A:
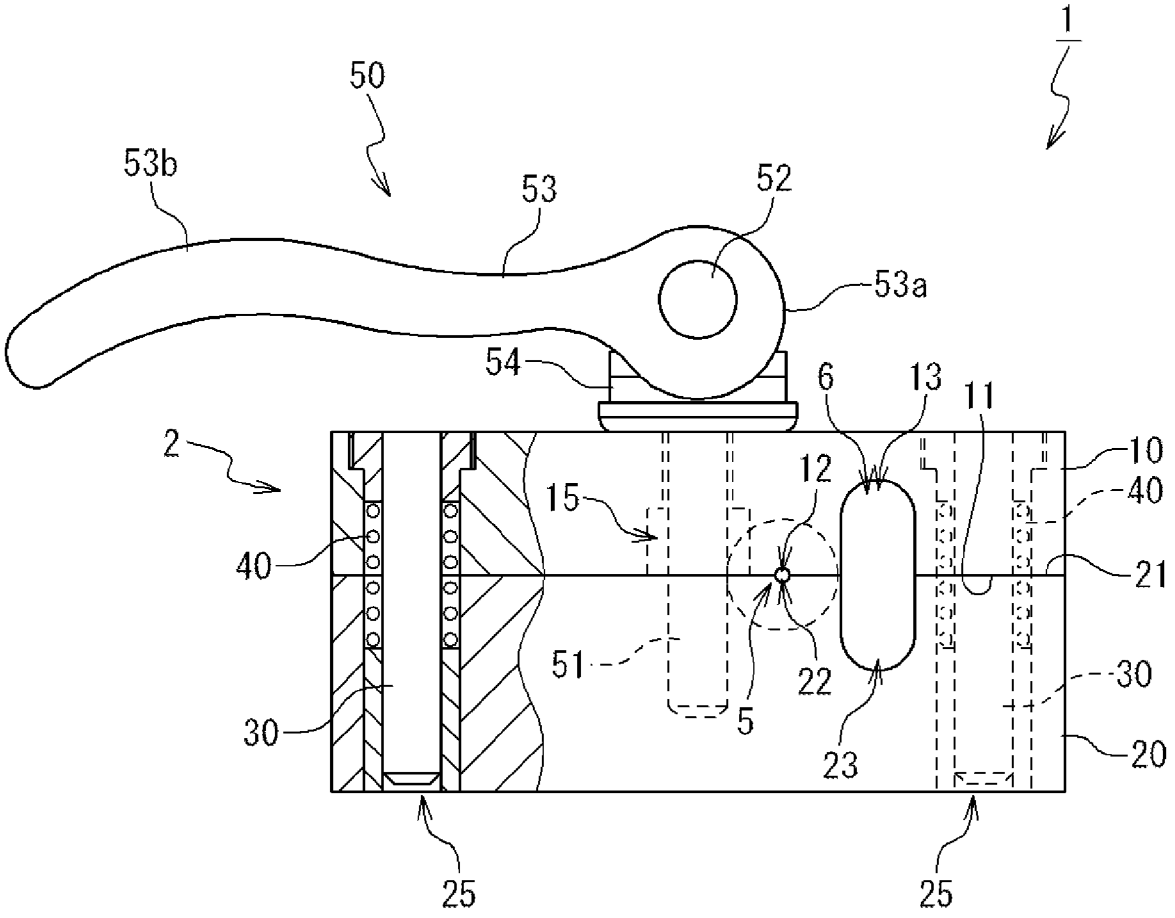
FIG. 1A is a front view of a wire insertion tool according to a first embodiment of the present invention.

Referring to FIG. 1A, the wire insertion tool 1 according to a first embodiment of the present invention is provided with an upper-side division block 10, a lower-side division block 20, two positioning guides 30, two springs 40 and a cam clamp 50.

The upper-side division block 10 is formed in a block. The upper-side division block 10 is provided with a wire insertion guide ditch forming plane 11. The wire insertion guide ditch 12 and the wire drawing ditch 13 are formed in the wire insertion guide ditch forming plane 11. The wire insertion guide ditch 12 and the wire drawing ditch 13 are apart from each other. The positioning guide 30 is fixed in the upper-side division block 10. The positioning guide 30 protrudes perpendicularly from the wire insertion guide ditch forming plane 11. For example, the positioning guide 30 is a positioning pin. The cam clamp axis arrangement hole 15 is formed to pass through the upper-side division block 10. The axial direction of the cam clamp axis arrangement hole 15 is perpendicular to the wire insertion guide ditch forming plane 11. One end of the cam clamp axis arrangement hole 15 is open to the wire insertion guide ditch forming plane 11.

The lower-side division block 20 is formed in a block. The lower-side division block 20 has a wire insertion guide ditch forming plane 21. The wire insertion guide ditch 22 and the wire drawing ditch 23 are formed in the wire insertion guide ditch forming plane 21. The wire insertion guide ditch 22 and the wire drawing ditch 23 are apart from each other. The two positioning guide arrangement holes 25 are formed in the lower-side division block 20. The axial direction of the positioning guide arrangement hole 25 is perpendicular to the wire insertion guide ditch forming plane 21. One end of the positioning guide arrangement hole 25 is open to the wire insertion guide ditch forming plane 21. The positioning guide arrangement hole 25 may or may not pass through the lower-side division block 20.

The two positioning guides 30 are arranged in the two positioning guide arrangement holes 25, respectively. The positioning guide 30 guides the lower-side division block 20 linearly to the upper-side division block 10 so that the wire insertion guide ditch forming plane 11 and the second wire insertion guide ditch forming plane 12 approach to each other or separate from each other in an opposing condition of them. That is, the positioning guide 30 defines the relative positions of the upper-side division block 10 and the lower-side division block 20 by limiting a relative displacement in a plane parallel to the wire insertion guide ditch forming planes 11 and 21 of the upper-side division block 10 and the lower-side division block 20. It should be noted that the positioning guide 30 may be provided to guide the upper-side division block 10 linearly to the lower-side division block 20. The spring 40 is provided to bias the upper-side division block 10 and the lower-side division block to separate the wire insertion guide ditch forming plane 11 and the wire insertion guide ditch forming plane 21. For example, the spring 40 is a coil spring which is arranged around the positioning guide 30. It should be noted that the numbers of positioning guides 30, positioning guide arrangement holes 25 and springs 40 may be equal to or more than 3.

The cam clamp 50 is configured to allow the upper-side division block 10 and the lower-side division block 20 to be held in the condition (surface contact condition) that the wire insertion guide ditch forming plane 11 and the wire insertion guide ditch forming plane 21 are fit. The cam clamp 50 is provided with a shaft 51, a driver 53 and a follower 54. The shaft 51 is arranged in the cam clamp axis arrangement hole 15 to protrude the both ends of the shaft 51 from the both surface of the upper-side division block 10. One of the both ends of the shaft 51 is fixed on the lower-side division block 20 and the other of the both ends of the shaft 51 is provided for a rotation axis 52. The driver 53 is provided with a cam part **53*a* which is rotated around the rotation axis 52 and a lever part 53*b* which is fixed on the cam part 53*a*. In FIG. 1A, an upper portion of the cam part 53*a* is thin and the lower portion of the cam part 53*a* is thick. Therefore, when the driver 53 is driven to an upper direction, the upper-side division block 10 and the lower-side division block 20 are set to be not in the fitting condition. The follower 54 is provided between the cam part 53*a* and the upper-side division block 10 to be removable along the shaft 51 and engages the cam part 53*a* and the upper-side division block 10**.

When a coupling unit 2 is formed from the upper-side division block 10 and the lower-side division block 20 by fitting the wire insertion guide ditch forming plane 11 and the wire insertion guide ditch forming plane 21, the wire insertion guide ditch 12 and the wire insertion guide ditch 22 form the wire insertion guide hole 5, and the wire drawing ditch 13 and the wire drawing ditch 23 form the wire drawing hole 6.

It should be noted that the wire insertion guide hole 5 and the wire drawing hole 6 may be arranged between the two positioning guides 30 and also may be arranged outside the two positioning guides 30.

Figure 1B:
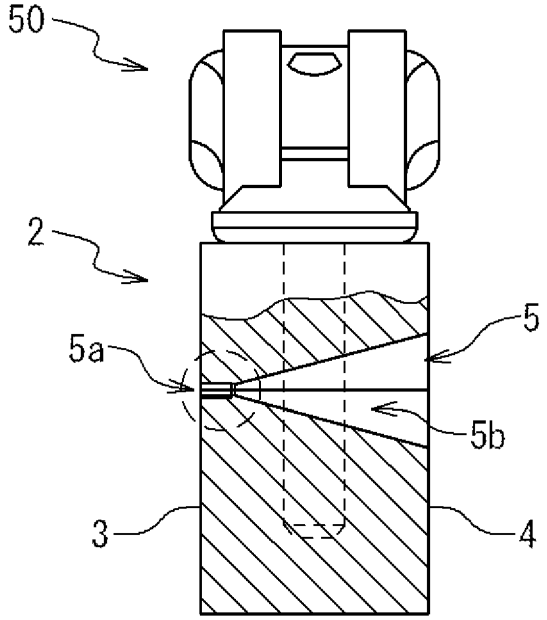
FIG. 1B is a side view of the wire insertion tool according to the first embodiment.

Referring to FIG. 1B, the wire insertion guide hole 5 passes through the coupling unit 2 from one side 3 to the other side 4. In the condition that the wire insertion guide ditch forming plane 11 and the wire insertion guide ditch forming plane 21 are fit, the wire insertion guide ditch forming plane 11, the wire insertion guide ditch forming plane 12 and a centerline of the wire insertion guide hole 5 are arranged on a same plane. The wire insertion guide hole 5 is provided with a circular tube section **5*a* open to the one side 3 and a taper section 5*b* which is formed to gradually become narrow from the other side 4 toward the circular tube section 5*a*. Although being not shown in FIG. 1B, the wire drawing hole 6 also passes through the coupling unit 2 from one side 3 to the other side 4. It should be noted that the wire drawing hole 6 is formed to be sufficiently wider than the circular tube section 5*a***.

Figure 1C:
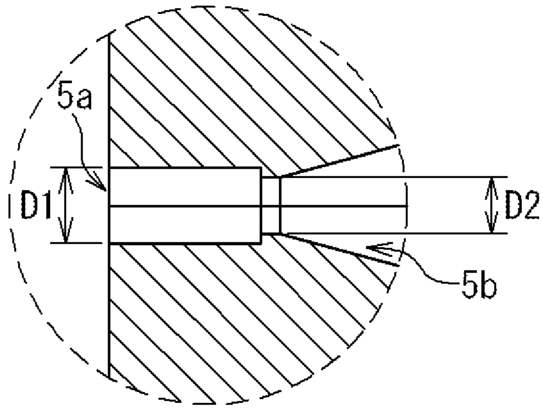
FIG. 1C is a partial expanded view of FIG. 1B.

Referring to FIG. 1C, the inner diameter of the circular tube section **5*a* is shown as D1 and the inner diameter of the narrowest part of the taper section 5*b* is shown as D2**.

Figure 2:
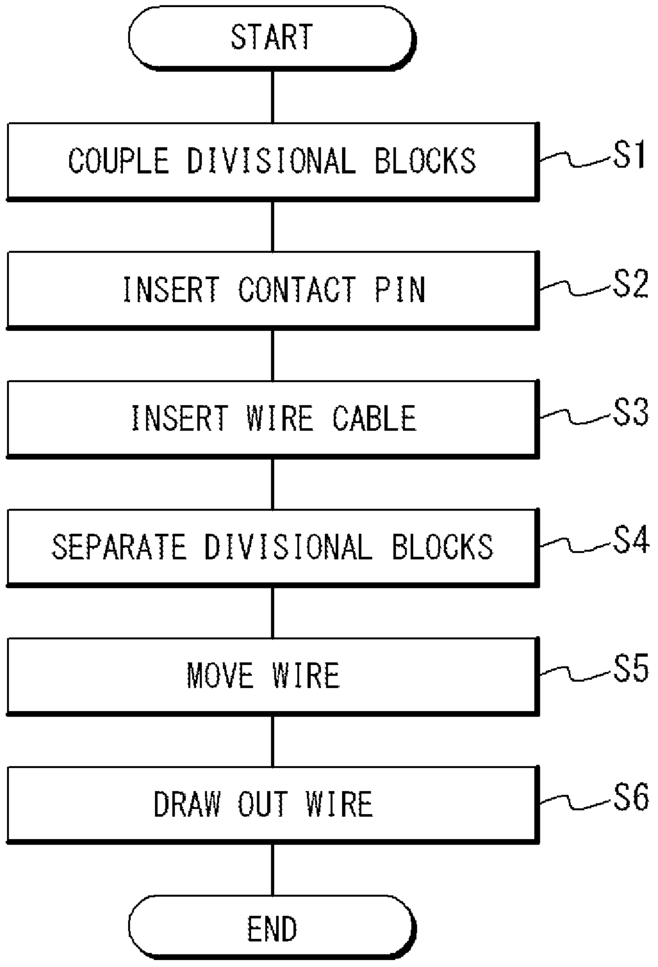
FIG. 2 is a flow chart of a wire inserting method according to the first embodiment.

Referring to FIG. 2, a method of inserting a wire by using the wire insertion tool 1 according to the present embodiment will be described. The method of inserting the wire is provided with a step S1 to a step S6.

At a step S1, an operator pushes the upper-side division block 10 onto the lower-side division block 20 by having the lever part **53*b* with the hand and rotating the cam clamp 50 downwardly, and couples the upper-side division block 10 and the lower-side division block 20 to fit the wire insertion guide ditch forming plane 11 and the wire insertion guide ditch forming plane 21. In detail, the follower 54 and the upper-side division block 10 are moved in the direction toward the lower-side division block 20 through the rotation of the driver 53, and the upper-side division block 10 is pushed to the lower-side division block 20. Thus, the coupling unit 2 is formed. By fitting the wire insertion guide ditch forming plane 11 and the wire insertion guide ditch forming plane 21, the wire insertion guide ditch 12 and the wire insertion guide ditch 22 form the wire insertion guide hole 5, and the wire drawing ditch 13 and the wire drawing ditch 23 form the wire drawing hole 6**.

Until separating the upper-side division block 10 and the lower-side division block 20 in the step S4, the upper-side division block 10 and the lower-side division block 20 are held by the cam clamp 50 in the condition that the wire insertion guide ditch forming plane 11 and the wire insertion guide ditch forming plane 21 are fit. Therefore, the operator can use both hands freely at the steps S2 and S3.

At the step S2, the operator inserts a contact pin (not shown) from the one side 3 of the coupling unit 2 into the circular tube section **5*a* of the wire insertion guide hole 5**.

At the step S3, the operator inserts a wire (not shown) into the contact pin from the other side 4 of the coupling unit 2 through the taper section **5*b* of the wire insertion guide hole 5 to attach the contact pin to the wire. At this time, because the wire is guided by the surfaces of the wire insertion guide ditches 12 and 22 which form the taper section 5*b*, the wire can be quickly and surely inserted into the contact pin. It should be noted that when the inner diameter D2 of the narrowest part of the taper section 5*b* is smaller than the inner diameter of the contact pin, it is prevented that the tip of the wire is caught on the end of the contact pin. Therefore, it is desirable that the inner diameter D2 of the narrowest part of the taper section 5*b* is smaller than the inner diameter D1 of the circular tube section 5*a***.

At the step S4, the operator separates the upper-side division block 10 and the lower-side division block 20 by having the lever part **53*b* with the hand and rotating the cam clamp 50 upwardly. In detail, because movable ranges of the follower 54 and the upper-side division block 10 are extended in a direction away from the lower-side division block 20 through the rotation of the driver 53, the condition is cancelled in which the wire insertion guide ditch forming plane 11 of the upper-side division block 10 and the wire insertion guide ditch forming plane 21 and the lower-side division block 20 are fit. As a result, the springs 40 separate the upper-side division block 10 and the lower-side division block 20 such that a space is formed between the wire insertion guide ditch forming plane 11 and the wire insertion guide ditch forming plane 21. Because the upper-side division block 10 and the lower-side division block 20 are separated by the springs 40**, the workability is excellent.

At the step S5, the operator moves the contact pin and the wire inserted therein from a position corresponding to the wire insertion guide ditch 12 and the wire insertion guide ditch 22 to a position corresponding to the wire drawing ditch 13 and the wire drawing ditch 23 through a space between the upper-side division block 10 and the lower-side division block 20.

At the step S6, the operator pulls out the contact pin and the wire inserted therein from the space between the upper-side division block 10 and the lower-side division block 20. By pulling out the wire from the position corresponding to the wire drawing ditch 13 and the wire drawing ditch 23, a sufficient distance can be secured between the contact pin and a set of the upper-side division block 10 and the lower-side division block 20, compared with a case to pull the wire from the position corresponding to the wire insertion guide ditch 12 and the wire insertion guide ditch 22. Therefore, when pulling out the wire, it is prevented that the contact pin contacts the upper-side division block 10 or the lower-side division block 20 so that the contact pin comes off from the wire. By providing the wire drawing ditch 13 and the wire drawing ditch 23 for the upper-side division block 10 and the lower-side division block 20, respectively, it becomes easy to pull the wire out of a space between the upper-side division block 10 and the lower-side division block 20, even when the space between the wire insertion guide ditch forming plane 11 and the wire insertion guide ditch forming plane 21 is small. When the space between the wire insertion guide ditch forming plane 11 and the wire insertion guide ditch forming plane 21 may be small, the wire insertion tool 1 can be made small in size.

After pulling out the wire, the operator crimps the wire and the contact pin.

According to the present embodiment, because the positioning guide 30 guides one of the upper-side division block 10 and the lower-side division block 20 linearly to the other, the shape of the wire insertion guide hole 5 to be formed at the step S1 has a high precise. In other words, center lines are prevented from being displaced between the contact pin inserted in the circular tube section 5*a* of the wire insertion guide hole 5 and the taper section 5*b* in the wire insertion guide hole 5. Therefore, according to the wire insertion tool and the method of inserting the wire according to the present embodiment, the work quality and the work-ability are excellent even when inserting a thin wire in a contact pin with a minimal diameter.

Moreover, because the coupling and separation of the upper-side division block 10 and the lower-side division block 20 can be carried out by a simple rotation of the cam clamp 50, the wire insertion tool 1 according to the present embodiment is excellent in work-ability.

Second Embodiment

Figure 3:
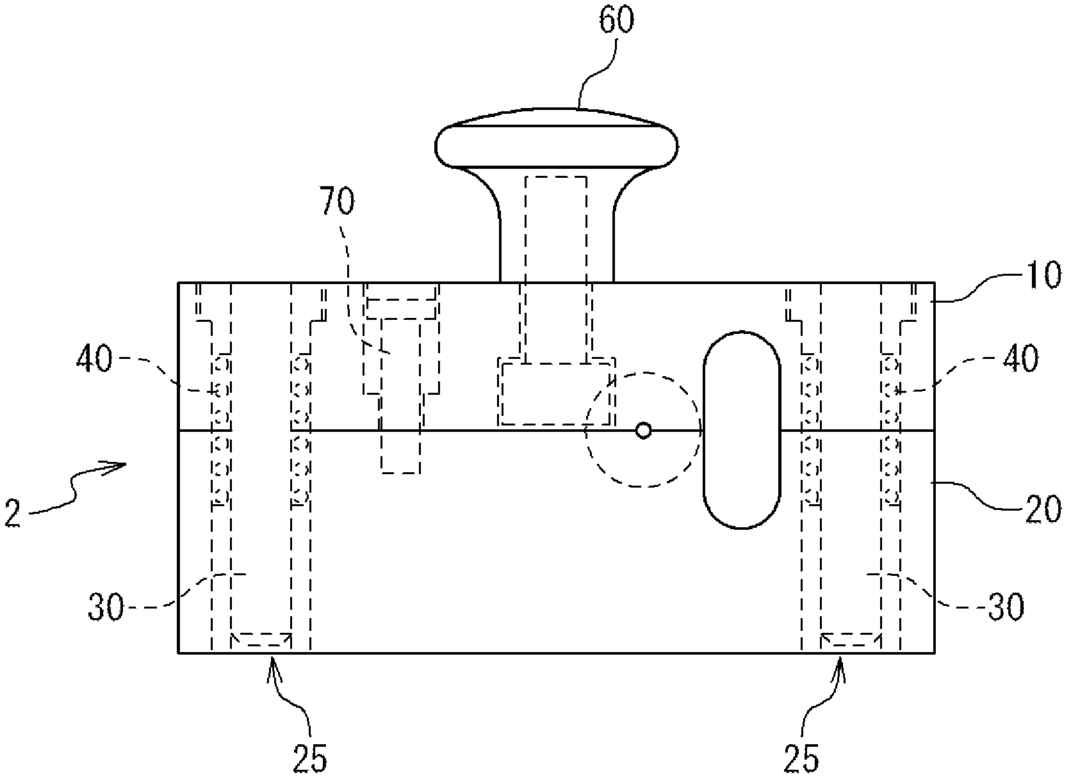
FIG. 3 is a front view of the wire insertion tool according to a second embodiment of the present invention.

Referring to FIG. 3, the wire insertion tool 1 according to a second embodiment of the present invention will be described. The wire insertion tool 1 according to the present embodiment is provided with the upper-side division block 10, the lower-side division block 20, the positioning guide 30 and the spring 40, like the wire insertion tool 1 according to the first embodiment, but it is not provided with the cam clamp 50. Moreover, the wire insertion tool 1 according to the present embodiment is provided with a knob 60 and a stopper 70. For example, the knob 60 is a picked knob fixed on the upper-side division block 10. The stopper 70 limits and prevents that the upper-side division block 10 and the lower-side division block 20 are separated beyond a predetermined distance. For example, the stopper 70 is a shoulder bolt fixed on the lower-side division block 20 so as to stop the upper-side division block 10 when the upper-side division block 10 is separated from the lower-side division block 20 by the predetermined distance.

The method of inserting a wire by using the wire insertion tool 1 according to the present embodiment is provided with the step S1 to the step S6, like the method of inserting a wire by using the wire insertion tool 1 according to the first embodiment, but the detail of the step S1 to the step S4 are different from those in the first embodiment.

At the step S1, the operator forms the coupling unit from the upper-side division block 10 and the lower-side division block 20 by having the knob 60 with the hand and pushing the upper-side division block 10 to the lower-side division block 20, such that the wire insertion guide ditch forming plane 11 and the wire insertion guide ditch forming plane 21 are fit. Thus, the coupling unit 2 is formed. By fitting the wire insertion guide ditch forming plane 11 and the wire insertion guide ditch forming plane 21, the wire insertion guide ditch 12 and the wire insertion guide ditch 22 form the wire insertion guide hole 5, and the wire drawing ditch 13 and the wire drawing ditch 23 form the wire drawing hole 6.

Until separating the upper-side division block 10 and the lower-side division block 20 in the step S4, the operator holds the upper-side division block 10 and the lower-side division block 20 in the condition that the wire insertion guide ditch forming plane 11 and the wire insertion guide ditch forming plane 21 are fit.

At the step S2, while holding the upper-side division block 10 and the lower-side division block 20 in the condition that the wire insertion guide ditch forming plane 11 and the wire insertion guide ditch forming plane 21 are fit, the operator inserts a contact pin (not shown) from the one side 3 of the coupling unit 2 into the circular tube section 5*a* of the wire insertion guide hole 5.

At the step S3, while holding the upper-side division block 10 and the lower-side division block 20 in the condition that the wire insertion guide ditch forming plane 11 and the wire insertion guide ditch forming plane 21 are fit, the operator inserts a wire (not shown) into the contact pin from the other side 4 of the coupling unit 2 through the taper section 5*b* of the wire insertion guide hole 5 and attaches the contact pin to the wire.

At the step S4, the operator separates the upper-side division block 10 and the lower-side division block 20 by relaxing the force applied to hold the upper-side division block 10 and the lower-side division block 20 in the condition that the wire insertion guide ditch forming plane 11 and the wire insertion guide ditch forming plane 21 are fit. Here, the case that the operator relaxes the force includes a case that the operator separates his hand from the knob 60 and a case that the operator does not separate. In detail, by relaxing the force, the spring 40 separates the upper-side division block 10 from the lower-side division block 20 until the upper-side division block 10 is stopped by the stopper 70. As a result, the upper-side division block 10 and the lower-side division block 20 are separated for a space to be formed between the wire insertion guide ditch forming plane 11 and the wire insertion guide ditch forming plane 21.

The steps S5 and S6 are the same as those in the first embodiment.

While it takes a time until the operator acclimates himself to the wire insertion tool 1 according to the present embodiment, the operation speed becomes faster when the acclimated operator uses the wire insertion tool 1 according to the present embodiment, compared with a case of using the wire insertion tool 1 according to the first embodiment.

In the above, the wire insertion tool and the method of inserting a wire according to the present invention have been described with reference to the embodiments. However, the wire insertion tool and the method of inserting the wire according to the present invention are not limited to the above embodiments. For example, the wire drawing ditches 12 and 22 may not be provided. The wire may be drawn out of the position corresponding to the wire insertion guide ditch 12 and the wire insertion guide ditch 22 at the step S6 without executing the step S5. Also, the operator may separate the upper-side division block 10 and the lower-side division block 20 with the hand without providing the springs 40.

What is claimed is:

1. A wire inserting tool comprising:

a first division block having a first wire insertion guide ditch forming plane where a first wire insertion guide ditch has been formed;

a second division block having a second wire insertion guide ditch forming plane where a second wire insertion guide ditch has been formed; and a division block positioning guide, wherein when said first division block and said second division block form a coupling unit by fitting said first wire insertion guide ditch forming plane and said second wire insertion guide ditch forming plane, said first wire insertion guide ditch and said second wire insertion guide ditch form a wire insertion guide hole to pass through said coupling unit from one side thereof to another side thereof, and wherein said division block positioning guide guides one of said first division block and said second division block linearly to another of said first division block and said second division block such that said first wire insertion guide ditch forming plane and said second wire insertion guide ditch forming plane approach to each other or separate from each other.

2. The wire insertion tool according to claim 1, wherein said division block positioning guide comprises two positioning pins which are fixed on one of said first division block and said second division block, and wherein said two positioning pins are arranged in positioning pin arrangement holes formed in another of said first division block and said second division block, respectively.

3. The wire insertion tool according to claim 1, wherein a first wire drawing ditch which is different from said first wire insertion guide ditch is formed on said first wire insertion guide ditch forming plane, wherein a second wire drawing ditch which is different from said second wire insertion guide ditch is formed on said second wire insertion guide ditch forming plane, and wherein said first wire drawing ditch and said second wire drawing ditch form a wire drawing hole to pass through said coupling unit from one side thereof to another side thereof, when said first division block and said second division block form said coupling unit by fitting said first wire insertion guide ditch forming plane and said second wire insertion guide ditch forming plane.

4. The wire insertion tool according to claim 1, further comprising:

a spring configured to bias said first division block and said second division block so as to separate said first wire insertion guide ditch forming plane and said second wire insertion guide ditch forming plane.

5. The wire insertion tool according to claim 1, further comprising:

a cam clamp configured to hold said first division block and said second division block in a condition that said first wire insertion guide ditch forming plane and said second wire insertion guide ditch forming plane are fit with each other.

* * * * *